US012634148B2

(12) United States Patent
Du et al.

(10) Patent No.: US 12,634,148 B2
(45) Date of Patent: May 19, 2026

(54) ANTI-COUNTERFEITING VERIFYING METHOD, HARDWARE APPARATUS, SYSTEM, ELECTRONIC DEVICE, AND STORAGE MEDIUM

(71) Applicant: BOE TECHNOLOGY GROUP CO., LTD., Beijing (CN)

(72) Inventors: Hongjun Du, Beijing (CN); Tao Li, Beijing (CN); Xingxing Zhao, Beijing (CN); Huailiang Wang, Beijing (CN); Hongda Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 244 days.

(21) Appl. No.: 18/273,068

(22) PCT Filed: Aug. 30, 2022

(86) PCT No.: PCT/CN2022/115909
§ 371 (c)(1),
(2) Date: Jul. 19, 2023

(87) PCT Pub. No.: WO2024/044978
PCT Pub. Date: Mar. 7, 2024

(65) Prior Publication Data
US 2024/0073028 A1 Feb. 29, 2024

(51) Int. Cl.
H04L 9/32 (2006.01)
H04L 9/08 (2006.01)

(52) U.S. Cl.
CPC .......... H04L 9/3247 (2013.01); H04L 9/0877 (2013.01); H04L 9/3297 (2013.01)

(58) Field of Classification Search
CPC .... H04L 9/3213; H04L 9/3247; H04L 9/3226
See application file for complete search history.

(56) References Cited

U.S. PATENT DOCUMENTS 6,851,054 B2 * 2/2005 Wheeler ............. H04L 63/0823
713/180
7,552,333 B2 * 6/2009 Wheeler ............. G06Q 20/3829
380/282

(Continued)

FOREIGN PATENT DOCUMENTS

CN 107579817 A 1/2018
CN 110598433 A 12/2019

(Continued)

*Primary Examiner* — Mohammad A Siddiqi
(74) *Attorney, Agent, or Firm* — WHDA, LLP

(57) ABSTRACT

The present disclosure provides an anti-counterfeiting verifying method, a hardware apparatus, a system, an electronic device and a storage medium, which aim at improving anti-counterfeiting effectiveness for the electronic products, the method includes: executing a step of generating to-be-verified information of the first device in response to a triggered verification event; outputting the to-be-verified information to indicate a second device to send the to-be-verified information to a verifying terminal, the verifying terminal being configured to for verifying authenticity of the first device according to the to-be-verified information, and feeding back a verification result to the first device and/or the second device for displaying, wherein the step of generating the to-be-verified information of the first device includes: obtaining a device identifier of the first device and a private key pre-stored in the first device.

17 Claims, 5 Drawing Sheets

(56) References Cited

U.S. PATENT DOCUMENTS

| | | | | |
|---|---|---|---|---|
| 7,558,965 B2* | 7/2009 | Wheeler | H04L 9/3231 | |
| | | | 340/5.82 | |
| 12,294,572 B2* | 5/2025 | Wang | H04L 63/045 | |
| 2003/0110477 A1* | 6/2003 | Wakabayashi | G06F 30/33 | |
| | | | 714/E11.178 | |
| 2003/0163374 A1* | 8/2003 | Akiyama | G06Q 30/02 | |
| | | | 705/14.27 | |
| 2017/0323121 A1* | 11/2017 | Liu | G06F 21/57 | |
| 2017/0325171 A1* | 11/2017 | Xu | H04W 52/0267 | |
| 2019/0014127 A1* | 1/2019 | Zhao | H04L 63/123 | |
| 2019/0026749 A1* | 1/2019 | Gao | G06K 7/10297 | |
| 2020/0322170 A1* | 10/2020 | Jin | H04L 41/0806 | |
| 2022/0027906 A1* | 1/2022 | Tang | G06Q 20/40145 | |
| 2023/0063590 A1* | 3/2023 | Luo | G06F 21/32 | |
| 2023/0283485 A1* | 9/2023 | Lamm | H04L 9/3268 | |
| | | | 726/10 | |
| 2024/0037310 A1* | 2/2024 | Chen | G06F 30/39 | |
| 2025/0097017 A1* | 3/2025 | Hu | H04L 9/12 | |

FOREIGN PATENT DOCUMENTS

| | | | |
|---|---|---|---|
| CN | 112148314 A | 12/2020 | |
| CN | 114301597 A | 4/2022 | |
| WO | 2022/041151 A1 | 3/2022 | |

* cited by examiner

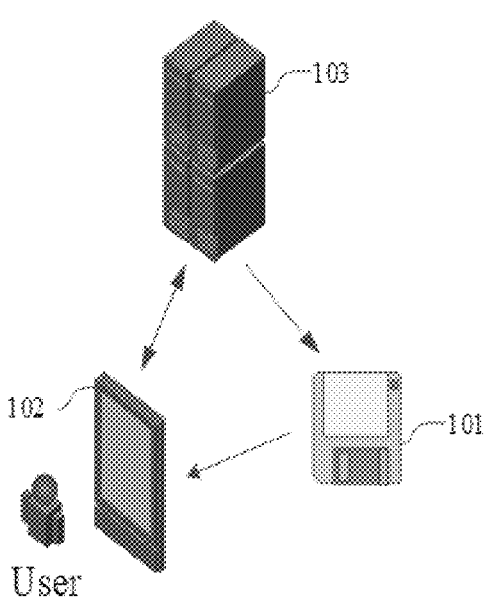

User

FIG. 1

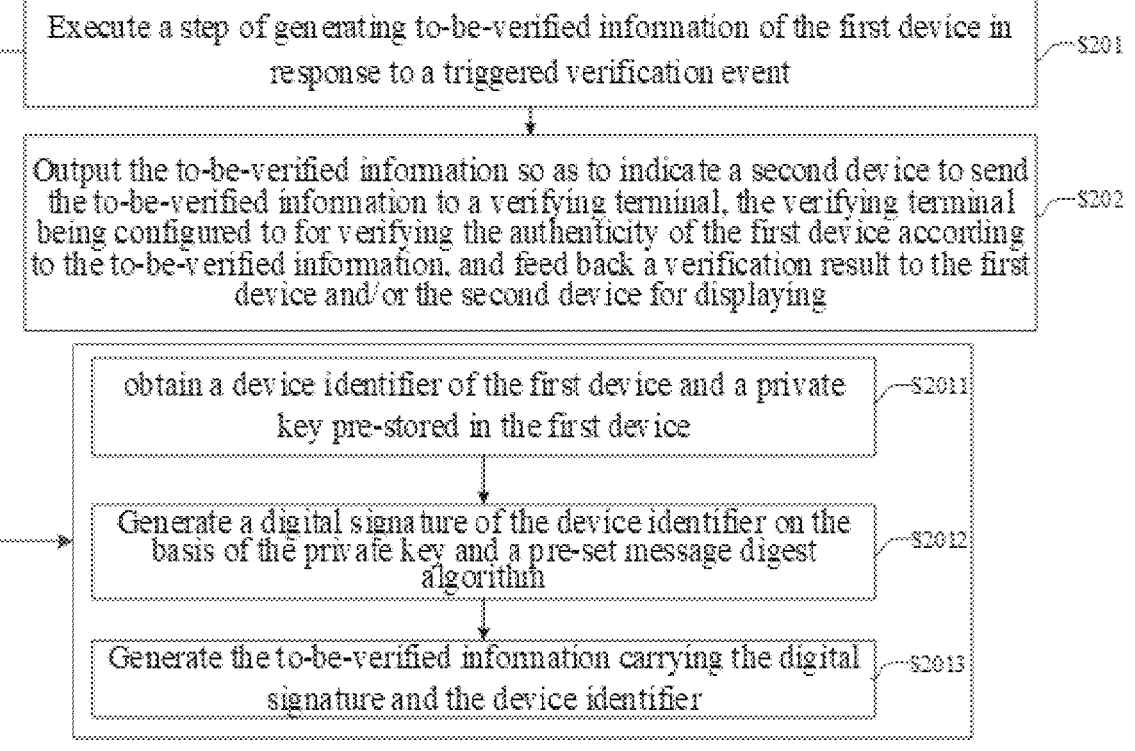

Execute a step of generating to-be-verified information of the first device in response to a triggered verification event ⎤—S201

Output the to-be-verified information so as to indicate a second device to send the to-be-verified information to a verifying terminal, the verifying terminal being configured to for verifying the authenticity of the first device according to the to-be-verified information, and feed back a verification result to the first device and/or the second device for displaying ⎤—S202 obtain a device identifier of the first device and a private key pre-stored in the first device ⎤—S2011

Generate a digital signature of the device identifier on the basis of the private key and a pre-set message digest algorithm ⎤—S2012

Generate the to-be-verified information carrying the digital signature and the device identifier ⎤—S2013

FIG. 2

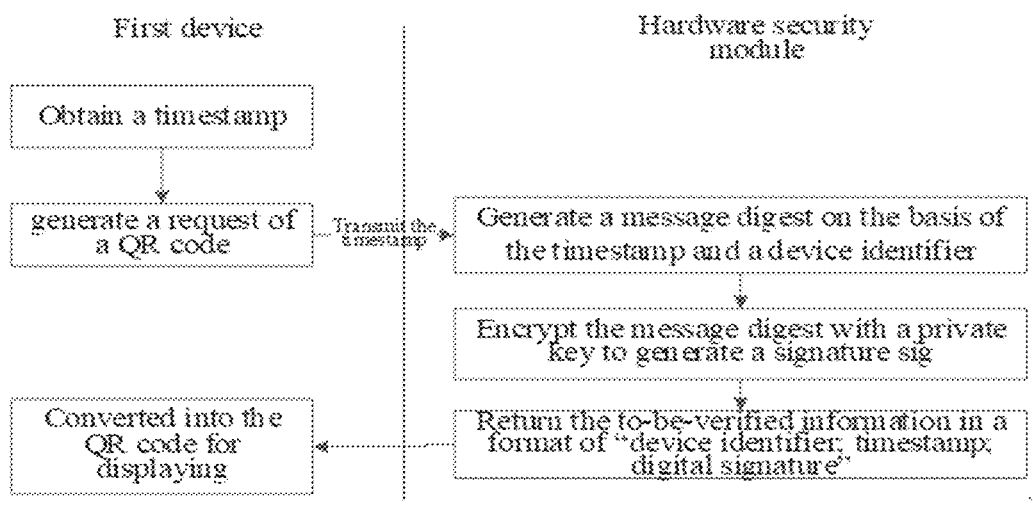

First device

Obtain a timestamp generate a request of a QR code

Converted into the QR code for displaying

Transmit the timestamp

Hardware security module

Generate a message digest on the basis of the timestamp and a device identifier

Encrypt the message digest with a private key to generate a signature sig

Return the to-be-verified information in a format of "device identifier; timestamp; digital signature"

FIG. 3

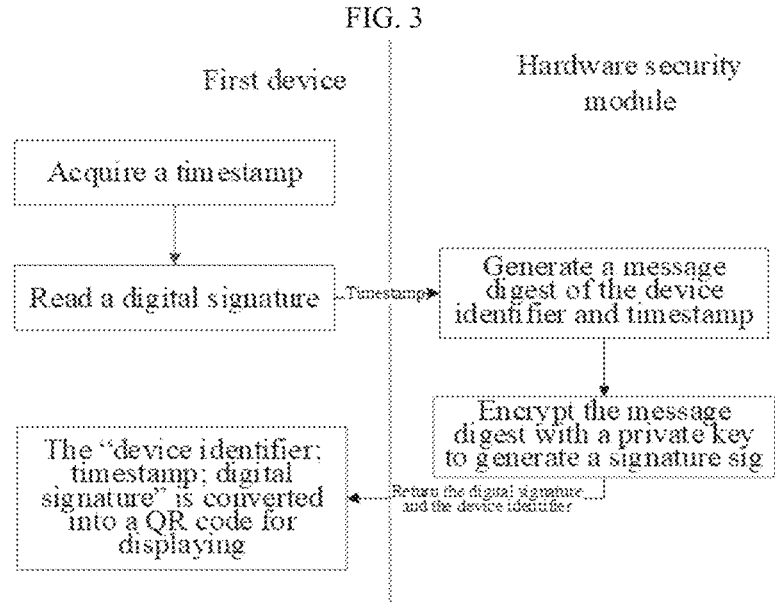

First device

Acquire a timestamp

Read a digital signature

The "device identifier; timestamp; digital signature" is converted into a QR code for displaying Timestamp Return the digital signature and the device identifier Hardware security module Generate a message digest of the device identifier and timestamp Encrypt the message digest with a private key to generate a signature sig

FIG. 4

Receive to-be-verified information sent by a second device, wherein the to-be-verified information carries a device identifier and a digital signature of a first device, and the digital signature is a signature of the device identifier generated by the first device on the basis of a private key pre-stored in the first device and a pre-set message digest algorithm       — S501

Verify the authenticity of the first device on the basis of the to-be-verified information, a pre-stored public key, and the pre-stored message digest algorithm to obtain a verification result       — S502

Return the verification result to the first device and/or the second device for displaying       — S503

FIG. 5

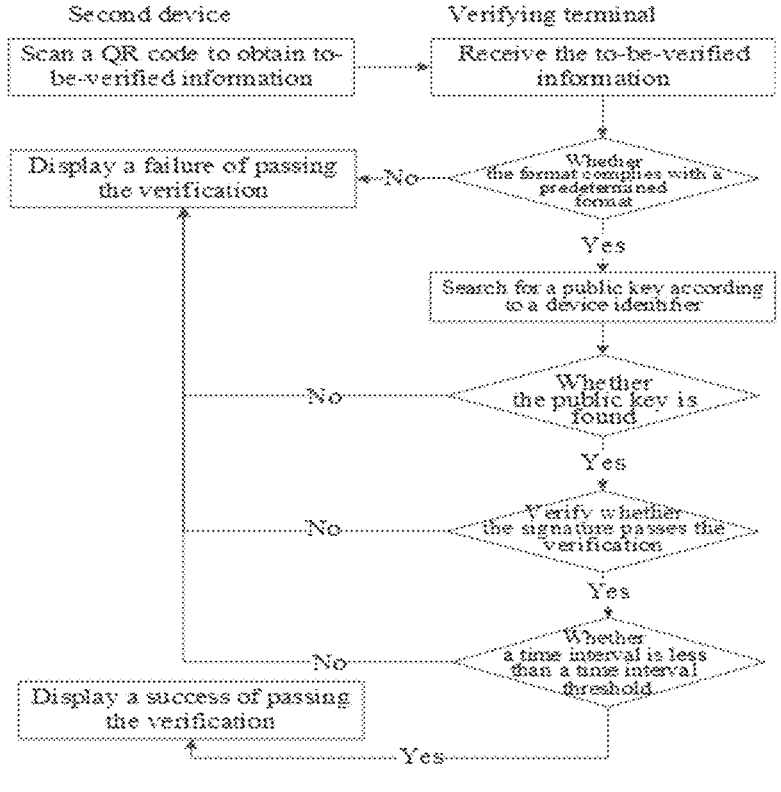

FIG. 6

Obtain to-be-verified information from a first device, wherein the to-be-verified information carries a device identifier and a digital signature of the first device, and the digital signature is a signature of the device identifier generated by the first device on the basis of a private key pre-stored in the first device and a pre-set message digest algorithm — S701

Send a verification request carrying the to-be-verified information to a verifying terminal so as to indicate the verifying terminal to verify the authenticity of the first device according to the to-be-verified information, and feed back a verification result to the first device and/or second device for displaying — S702

FIG. 7

ANTI-COUNTERFEITING VERIFYING METHOD, HARDWARE APPARATUS, SYSTEM, ELECTRONIC DEVICE, AND STORAGE MEDIUM

TECHNICAL FIELD

The present disclosure relates to the field of communications technology and, more particularly, to an anti-counterfeiting verifying method, a hardware apparatus, a system, an electronic device and a storage medium.

BACKGROUND

In the anti-counterfeiting identification of goods, how to perform effective anti-counterfeiting has always been a concern of various manufacturers. Wherein, in the anti-counterfeiting of terminal devices, the requirements for anti-counterfeiting effectiveness are higher. In the related art, the anti-counterfeiting technologies of the terminal devices mainly include physical anti-counterfeiting and software anti-counterfeiting.

Among them, the physical anti-counterfeiting is generally a posted bar code anti-counterfeiting label, a two-dimensional code anti-counterfeiting label, a laser anti-counterfeiting label, a radio frequency identification (RFID) anti-counterfeiting label, fluorescent anti-counterfeiting, stealth dark code anti-counterfeiting and other physical label anti-counterfeiting. Software anti-counterfeiting generally refers to inputting a serial number of a product in the official website of the terminal device to query.

However, the anti-counterfeiting labels in physical anti-counterfeiting are easy to be torn off, and after the anti-counterfeiting labels are torn off, it is impossible to query the authenticity. Some physical labels need to be configured with special instruments to detect and identify, but they cannot eliminate the problem of being copied and counterfeited. However, the scheme of software anti-counterfeiting cannot eliminate that counterfeit products copy the serial number of the market products.

In summary, there is a problem of low anti-counterfeiting effectiveness of terminal devices in the related art.

SUMMARY

In a first aspect of the present disclosure, an anti-counterfeiting verifying method is provided, which is applied to a first device, and the method includes:

executing a step of generating to-be-verified information of the first device in response to a triggered verification event;

outputting the to-be-verified information to indicate a second device to send the to-be-verified information to a verifying terminal, the verifying terminal being configured for verifying authenticity of the first device according to the to-be-verified information, and feeding back a verification result to the first device and/or the second device for displaying;

wherein the step of generating the to-be-verified information of the first device includes:

obtaining a device identifier of the first device and a private key pre-stored in the first device; generating a digital signature of the device identifier on the basis of the private key and a pre-set message digest algorithm; and generating the to-be-verified information carrying the digital signature and the device identifier.

In a second aspect of the present disclosure, an anti-counterfeiting verifying method is provided, wherein the method is applied to a verifying terminal and includes:

receiving to-be-verified information sent by a second device, wherein the to-be-verified information carries a device identifier and a digital signature of a first device, and the digital signature is a signature of the device identifier generated by the first device on the basis of a private key pre-stored in the first device and a pre-set message digest algorithm;

verifying the authenticity of the first device on the basis of the to-be-verified information, a pre-stored public key and the pre-stored message digest algorithm to obtain a verification result; and returning the verification result to the first device and/or the second device for displaying.

In a third aspect of the present disclosure, an anti-counterfeiting verifying method is provided, wherein the method is applied to a second device and includes:

obtaining to-be-verified information from a first device, wherein the to-be-verified information carries a device identifier and a digital signature of the first device, and the digital signature is a signature of the device identifier generated by the first device on the basis of a private key pre-stored in the first device and a pre-set message digest algorithm;

sending a verification request carrying the to-be-verified information to a verifying terminal to indicate the verifying terminal to verify the authenticity of the first device according to the to-be-verified information, and feeding back a verification result to the first device and/or second device for displaying; wherein the step of obtaining the to-be-verified information from the first device includes at least one of:

scanning a QR code displayed by the first device to obtain the to-be-verified information, wherein the QR code is generated by the first device on the basis of the to-be-verified information; and receiving the to-be-verified information sent by the first device via wired or wireless communication.

In a fourth aspect of the present disclosure, a hardware apparatus is provided, wherein the hardware apparatus is configured to execute the anti-counterfeiting verifying method according to the first aspect, wherein the hardware apparatus includes a hardware device to be verified for anti-counterfeiting thereof and a hardware security module configured onto the hardware device, wherein the hardware security module stores a device identifier and a private key of the hardware device.

In a fifth aspect of the present disclosure, an anti-counterfeiting verifying system is provided, including:

a first device configured to execute a step of generating to-be-verified information of the first device in response to a triggered verification event and output the to-be-verified information;

a second device configured to obtain the to-be-verified information and send the to-be-verified information to a verifying terminal;

the verifying terminal configured to verify the anti-counterfeiting of the first device according to the to-be-verified information, and feed back a verification result to the first device and/or the second device for displaying;

wherein the step of generating the to-be-verified information of the first device includes:

obtaining a device identifier of the first device and a private key pre-stored in the first device; generating a digital signature of the device identifier on the basis of the private key and a pre-set message digest algorithm; and generating the to-be-verified information carrying the digital signature and the device identifier.

An electronic device is further disclosed in the present disclosure, wherein the electronic device stores a computer program that causes a processor to execute the anti-counterfeiting verifying method according to the first aspect, or the second aspect, or the third aspect.

A computer-readable storage medium is further disclosed in the present disclosure, wherein the computer-readable storage medium stores a computer program that causes a processor to execute the anti-counterfeiting verifying method according to the first aspect, or the second aspect or the third aspect.

In the technical solution of the embodiments of the present disclosure, the first device to be verified for authenticity can obtain the device identifier and the private key thereof in response to the triggered verification event, to generate the digital signature of the device identifier on the basis of the pre-stored private key and the pre-set message digest algorithm, and can then generate the to-be-verified information carrying the digital signature and the device identifier; thereafter, the to-be-verified information is sent to the verifying terminal via the second device, and the verifying terminal determines the anti-counterfeiting of the first device on the basis of the to-be-verified information.

Since the digital signature is obtained by encrypting the device identifier by using the pre-stored private key and the pre-set message digest algorithm, in this way, the anti-counterfeiting measure for the terminal device of the present embodiment has the following advantages.

Firstly, an asymmetric encryption algorithm is applied to the anti-counterfeiting identification for the terminal device; since the private key of the asymmetric encryption algorithm is stored in the first device, in practice, the private key can be stored in a secured storage space of the first device and is not easy to be stolen, and thus a primary anti-counterfeiting mechanism for the first device is formed by means of the pre-stored private key.

Secondly, a digest of the device identifier is calculated through the pre-set message digest algorithm; since the major characteristic of the message digest algorithm is that the encrypted data cannot be decrypted, and the digests of the device identifier calculated by different message digest algorithms are different, that is, the same digests can only be obtained by inputting the same device identifiers and subjecting to the same message digest algorithms, therefore, a secondary anti-counterfeiting mechanism for the first device is formed by means of the message digest algorithm.

In summary, through the primary anti-counterfeiting mechanism and the secondary anti-counterfeiting mechanism, since the private key and the message digest algorithm can hardly be stolen at the same time, and thus the anti-counterfeiting effectiveness for the terminal device is improved. Compared with the anti-counterfeiting labels in the physical anti-counterfeiting, the to-be-verified information for verifying authenticity is generated instantly by the first device and cannot be copied or counterfeited; compared with the scheme of software anti-counterfeiting, since the to-be-verified information carries the digital signature, even if a counterfeiter steals the device identifier, they cannot reproduce the digital signature without the private key and the corresponding message digest algorithm, and as long as the digital signature is not reproduced, the verifying terminal may identify a counterfeit product, thereby ensuring the anti-counterfeiting effectiveness for the terminal device.

The above description is only an overview of the present disclosure of the technical solution, in order to be able to better understand the technical means of the present disclosure, and can be implemented in accordance with the content of the description, and in order to make the above and other purposes, features and advantages of the present disclosure more obvious and easy to understand, the specific embodiments of the present disclosure are hereby mentioned.

BRIEF DESCRIPTION OF THE DRAWINGS

In order to more clearly illustrate the technical solutions of the embodiments of the present disclosure or the prior art, the figures that are required to describe the embodiments or the prior art may be briefly introduced below. Apparently, the figures that are described below are embodiments of the present disclosure, and a person skilled in the art can obtain other figures according to these figures without paying creative work. It should be noted that the proportions in the drawings are only indicative and do not represent actual proportions.

FIG. 1 schematically shows an exemplary communication scenario diagram of an anti-counterfeiting verifying method of the present disclosure;

FIG. 2 schematically shows a flowchart of the step of the anti-counterfeiting verifying method of the present disclosure;

FIG. 3 schematically shows an overall schematic flow chart of a first device displaying a QR code;

FIG. 4 schematically shows an overall schematic flow chart of a first device displaying a QR code;

FIG. 5 schematically shows a flowchart of the step of yet another anti-counterfeiting verifying method of the present disclosure;

FIG. 6 schematically shows an optional schematic flow chart of a verifying terminal verifying the authenticity of the first device of the present disclosure;

FIG. 7 schematically shows a flowchart of the step of yet another anti-counterfeiting verifying method of the present disclosure;

DETAILED DESCRIPTION OF THE EMBODIMENTS

Figure 8:
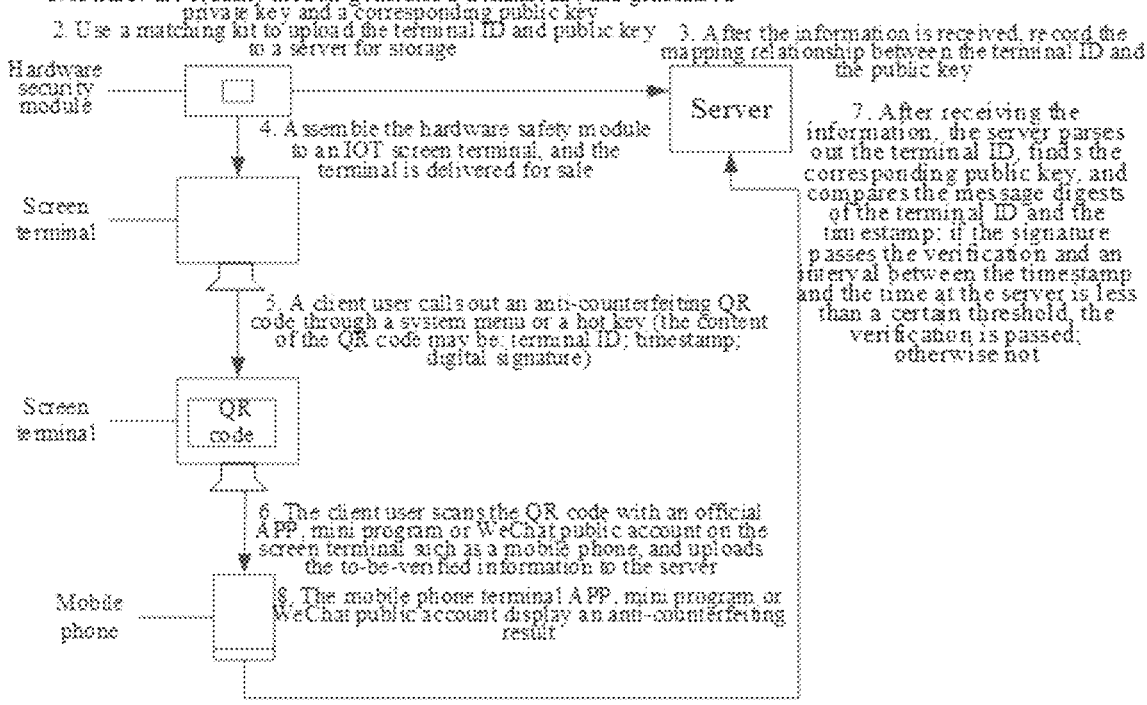
FIG. 8 schematically shows an overall schematic flow chart of the anti-counterfeiting verifying method of the present disclosure.

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In view of the problems in the related art, the present disclosure proposes the following core concepts to achieve effective anti-counterfeiting for terminal devices. A private key in an asymmetric encryption algorithm and a message digest algorithm are employed to generate a digital signature of a terminal device identifier (ID), and the digital signature and the terminal device ID are sent to a verifying terminal via a third-party device for verification to verify the authenticity of a first device, and then a verification result is displayed on the first device and/or a second device.

Referring to FIG. 1, there is shown an exemplary communication scenario diagram of the disclosed anti-counterfeiting verifying method, and as shown in FIG. 1, a first device 101, a second device 102, and a verifying terminal 103 are included. Herein, the verifying terminal 103 can be communicatively connected to the first device 101 and the second device 102, respectively; the first device 101 is a device to be verified for authenticity, that is, it is to be verified whether the first device 101 is a counterfeit device; the second device 102 may be a third-party device, such as a mobile phone, a computer and a tablet; the verifying terminal 103 may be a server.

Herein, the first device 101 may be any one of a network node device, a display screen, a computer device, a smart watch, a laptop computer, a set-top box and an Internet of Things terminal; certainly, the device is not limited to the above in practice, and the anti-counterfeiting verifying method of the present disclosure can be applied to any electronic device that needs to be authenticated in the field of communications.

Embodiment 1

Referring to FIG. 2 in conjunction with that shown in FIG. 1, a flowchart of the anti-counterfeiting verifying method of the present disclosure is shown in FIG. 2, as shown in FIG. 2, following steps are included:

step S201, executing a step of generating to-be-verified information of a first device in response to a triggered verification event, wherein step S201 specifically includes the following step S2011 and step S2013:

step S2011, obtaining a device identifier of the first device and a private key pre-stored in the first device;

step S2012, generating a digital signature of the device identifier on the basis of the pre-stored private key and a pre-set message digest algorithm;

step S2013, generating the to-be-verified information carrying the digital signature and the device identifier; and step S202, outputting the to-be-verified information to indicate a second device to send the to-be-verified information to a verifying terminal, the verifying terminal being configured for verifying the authenticity of the first device according to the to-be-verified information, and feeding back a verification result to the first device and/or the second device for displaying.

In the embodiment of the present disclosure, in the process of producing the first device, the device identifier, the private key and the pre-set message digest algorithm of the first device may be stored in the first device, and a public key corresponding to the private key, the pre-set message digest algorithm and the device identifier may be stored to the verifying terminal, so that subsequently the verifying terminal verifies the to-be-verified information of the first device on the basis of the public key and the message digest algorithm.

Wherein the triggered event can be an event of touching a physical key set on the first device or an event of a control displayed on a display interface of the first device being clicked, and specifically, either the key or the control has the function of reminding a user that the authenticity of the first device can be verified.

Wherein physical keys and/or controls can be set according to an actual hardware configuration of the first device, for example, in the case where the first device does not have a display screen, physical keys can be disposed; in the case where the first device has a display screen, physical keys and controls can be both disposed, or only the controls are disposed.

Wherein when the verification event is triggered, the first device may obtain the device identifier and the private key pre-stored in the first device from itself, use the pre-set message digest algorithm to generate a message digest of the device identifier, and generate the digital signature after encrypting the message digest with the private key; after the digital signature is generated, the digital signature and the device identifier may be combined to obtain the to-be-verified information.

Wherein the private key may use a key calculated through a typical asymmetric algorithm, and the asymmetric algorithm may be any one of RSA and national secret SM2, and certainly is not limited the RSA and the national secret SM2; the pre-set message digest algorithm can be any one of MD5, SHA-1, SHA-256, SHA-512 and national secret SM3 hash algorithm, etc., and it should be noted that in the production of the first device, the pre-set message digest algorithm embedded in the first device is consistent with the message digest algorithm stored in the verifying terminal, to perform reliable anti-counterfeiting verification subsequently.

Wherein the to-be-verified information output can be obtained by the second device; specifically, the first device can send the to-be-verified information to the second device and can also display the to-be-verified information on the display screen of the first device, so that the second device can scan to obtain the to-be-verified information by photographing the display screen.

In the present embodiment, the second device can be communicatively connected to the verifying terminal; in a specific implementation, a client supported by the verifying terminal can be installed on the second device; for example, a manufacturer of the first device can develop an anti-counterfeiting client for performing anti-counterfeiting verification on a device produced thereby; thereafter, a user of the second device can download the anti-counterfeiting client, and when the users of the second device need to verify the authenticity of the first device, they can log in the anti-counterfeiting client and obtain the to-be-verified information output by the first device through the anti-counterfeiting client; the information is then sent to the verifying terminal by the anti-counterfeiting client.

Wherein the digital signature ca verify whether the device identifier in the to-be-verified information is tampered with, and if the device identifier is tampered with, the message digest obtained through calculation by the verifying terminal is inconsistent with the message digest obtained after decryption.

Therefore, when receiving the to-be-verified information, the verifying terminal can use the pre-stored public key to decrypt the digital signature carried in the to-be-verified information to obtain the message digest, and then the verifying terminal uses the pre-set message digest algorithm to generate the message digest of the device identifier carried in the to-be-verified information; if the message digest is consistent with the message digest obtained after decryption, it indicates the success of passing the verification, which means that the first device is not a counterfeit device; in the case of a failure of passing the verification, the first device is a counterfeit device.

Certainly, in some optional embodiments, it is also possible that the first device directly sends the to-be-verified information to the verifying terminal, so that the verifying terminal verifies the to-be-verified information; the verification result can be returned to the first device; if the first device is not configured with a display screen, the first device can send the verification result to the second device for displaying; if the first device is configured with a display screen, the first device can directly display the verification result.

For example, given a user, Mr. Li, who originally wants to buy a terminal device t produced by Company H, but actually he buy a terminal device f produced by Company F, a counterfeit manufacturer, without knowing; if Mr. Li wants to verify whether the terminal device f bought by himself is a genuine product, the following situations may help Mr. Li to determine that he buys a counterfeit terminal device.

1. The terminal f does not have a physical key or a control on a display screen to trigger a verification event at all, and therefore authentication cannot be triggered.

2. Company F knows that terminal device t has an authentication mechanism and although physical keys or controls for triggering the verification event are designed, however, it is unclear how to generate the to-be-verified information, so Company F designs by itself a mechanism for generating the to-be-verified information. In this case, the to-be-verified information needs to be sent to the verifying terminal by a third-party device, and the public key at a verified terminal cannot decrypt properly, so the verification is unsuccessful.

3. Company F knows that the terminal device t has an anti-counterfeiting mechanism, and also successfully stole the mechanism of generating the to-be-verified information; however, without either the private key or the message digest algorithm, the verification at the verifying terminal can never be successful.

In addition, it is difficult for Company F to obtain the to-be-verified information with a second device in hand and crack the private key and the message digest algorithm reversely through the to-be-verified information, because the private key cannot be cracked as long as it is not voluntarily disclosed by Company H. Furthermore, the message digest algorithm itself is an irreversible algorithm, hence reverse-crack of the algorithm cannot be achieved, not to mention an exhaustive way to try the preset message digest algorithm, which consumes a lot of manpower and material resources. Therefore, under a dual mechanism incorporating both the asymmetric encryption algorithm and the message digest algorithm, the anti-counterfeiting verifying mechanism of the present disclosure is rendered difficult to be cracked, and even if a counterfeiter wants to crack the mechanism, it has to pay a large expenditure of manpower and material resources, that is, the costs outweigh the gains. Therefore, the effectiveness of the anti-counterfeiting for the first device is improved.

In the embodiments of the present disclosure, the to-be-verified information needs to be sent by the third-party device, namely, the second device, to the verifying terminal, to avoid the problem of an anti-counterfeiting loophole occurring in the case where the first device itself generates the to-be-verified information and sends the same to the relevant verifying terminal by itself, more particularly, the counterfeit device of the counterfeiter sends the to-be-verified information to a back-end platform of its own for verification. As such, the anti-counterfeiting verification is more reliable.

The solution of the embodiments of the present disclosure that is used has the following advantages.

Since the private key of the asymmetric encryption algorithm is stored in the first device, in practice, the private key can be stored in a secured storage space of the first device and is not easy to be stolen, and thus the validity of the anti-counterfeiting verification is improved by means of the pre-stored private key; in addition, the message digest algorithm is mainly characterized in that the encrypted data cannot be decrypted, and the digests of the device identifier calculated by different message digest algorithms are different, hence the validity of the anti-counterfeiting can be further improved by means of the message digest algorithm.

In practice, compared with the anti-counterfeiting labels in physical anti-counterfeiting, the to-be-verified information of the present disclosure for verifying authenticity is generated instantly by the first device and cannot be copied or counterfeited; compared with the solution of the software anti-counterfeiting, since the to-be-verified information carries the digital signature, even if a counterfeiter steals the device identifier, he cannot reproduce the digital signature without the private key and the corresponding message digest algorithm, and as long as the digital signature is not reproduced, the verifying terminal may identify a counterfeit product, thereby ensuring the validity of the anti-counterfeiting for the terminal device.

In an optional embodiment, the step of generating the digital signature of the device identifier on the basis of the pre-stored private key and the pre-set message digest algorithm includes: generating a digest of the device identifier on the basis of the pre-set message digest algorithm; and encrypting the digest of the device identifier using the pre-stored private key to obtain the digital signature.

In the present embodiment, the process of generating the digital signature may include: firstly, generating the digest of the device identifier by using the pre-set message digest algorithm, in this case, the digest may be generally a hash value of the device identifier; and then encrypting the digest by using the private key to obtain the digital signature. The digital signature may be sent to the verifying terminal along with the device identifier as the to-be-verified information to verify whether the device identifier is tampered with.

As stated above, the anti-counterfeiting mechanism of the present disclosure includes the anti-counterfeiting mechanism of the asymmetric encryption algorithm and the anti-counterfeiting mechanism of the message digest algorithm, and in some embodiments, implementations with higher anti-counterfeiting effectiveness are proposed, which are specifically as follows.

In implementation A, a hardware security module is configured onto the first device to improve the security of the private key, the device identifier and the message digest algorithm, preventing the private key and the device identifier from being stolen, thereby further enhancing the anti-counterfeiting effectiveness.

In implementation B, an anti-counterfeiting mechanism for dynamically generating the digital signature, that is, when the digital signature and the to-be-verified information are generated, the digital signature for a timestamp of a present moment of the first device may also be generated, and at the verifying terminal, a time interval between the present moment of the first device and a present moment of verification on the basis of the timestamp of the present moment of verification. Whether the to-be-verified information is obtained legally by the second device is verified on the basis of the time interval may be verified, to reach dynamic and more strict anti-counterfeiting verification, thereby further enhancing the anti-counterfeiting effectiveness.

Implementations A and B can be used in combination in practice, that is, in the access verification for the first device, the first device is configured with both the hardware security module and the anti-counterfeiting mechanism for dynamically generating the digital signature.

<Implementation A>

In the implementation A, the hardware device is configured with the hardware security module, and the device identifier and the pre-stored private key are located within the hardware security module; accordingly, the step of obtaining the device identifier of the first device and the private key pre-stored in the first device in step S2011 and step S2012 may be such that the steps of obtaining the device identifier and the pre-stored private key from the hardware security module and generating the digital signature may be performed by the hardware security module, and then the to-be-verified information may be obtained from the hardware security module.

In the present embodiment, the hardware security module (HSM) is a computer hardware device configured to protect and manage keys used by a strong authentication system and, moreover, provide relevant cryptographic operations. The hardware security module is directly connected to a computer or a network server as an expansion card or an external device.

In the present embodiment, it is possible to prepare a certain number of hardware security modules when producing the first device according to a production plan, and the hardware security module is employed to generate the device identifier, the private key and the public key of the first device; after this, the hardware security module sends the public key and the device identifier to the verifying terminal for storage; with the first device and the hardware security module ready, different hardware security modules may be configured onto different first devices, so that one first device is configured with one hardware security module.

The hardware security module provides the protection at both the logical level and physical level for sensitive information including the keys, to prevent unauthorized access or possible invading, therefore, storing the device identifier and the private key in the hardware security module can avoid the problem that the device identifier and the private key are stolen anyhow, which greatly improves the security of the device identifier and the private key.

With the present implementation, the first device and the hardware security module can be integrated into a complete device, and then a driving software development kit (SDK) for reading the device identifier, the private key, and an algorithm for generating the to-be-verified information through the message digest algorithm and the private key of the information stored in the hardware security module can be integrated in the first device, so that the first device has the function of access verification.

Certainly, in the case where the first device is not configured with the hardware security module, to ensure the security of the private key and the device identifier, the device identifier and the private key can be stored in a secured storage of the hard first device, and then the first device can obtain the device identifier and the private key from the secured storage.

Wherein, the secured storage area may be a storage area having a data protection function, for example, a solid-state hard disk having a certain data protection function; Optionally, the secured storage area may be a pre-designated storage block on the first device specially allocated to storing the device identifier and the private key.

In an optional embodiment, since the device identifier and the pre-stored private key are located within the hardware security module, in practice, to ensure the security of the asymmetric encryption process, the step of generating the to-be-verified information can also be performed by the hardware security module; specifically, the first device may output an information generation instruction to the hardware security module in response to the verification event; the information generation instruction is for driving the hardware security module to perform the step of generating the to-be-verified information of the first device, that is, the process of steps 2011 to 2013 is performed by the hardware security module.

In the present optional embodiment, when the first device detects the verification event, the information generation instruction may be output to the hardware security module via a port connected to the hardware security module, and the information generation instruction can be transmitted to the hardware security module via an API interface between the hardware security module and the first device; as such, driven by the information generation instruction, the hardware security module executes the step of generating the to-be-verified information of the first device.

In this case, the only requirement is that the hardware security module has sufficient computing power, and the whole process of generating the to-be-verified information can be built in the hardware security module. Thus, such a solution can be used for a first device without an operating system, and the first device only needs to output the to-be-verified information, for example, to display the to-be-verified information. Certainly, such a solution may also be applied to a first device having an operating system, that is, the hardware security module is used to generate the to-be-verified information, requiring only that the first device output the to-be-verified information.

In this case, reference can be made to the relevant description of FIG. 3, that is, in the case of generating the digital signature on the basis of a dynamic timestamp, the first device sends the timestamp of the present moment to the hardware security module, and the hardware security module generates the timestamp and the message digest of the device identifier and then encrypts the message digest by using the private key to obtain the digital signature; the digital signature, the device identifier and the timestamp are combined to generate the to-be-verified information, and then after the first device obtains the to-be-verified information, and a QR code is generated for displaying.

With the technical solution of this example of implementation, the hardware security module generates the to-be-verified information, hence the anti-counterfeiting verification is more secure.

Certainly, in yet another optional embodiment, the hardware security module may return the digital signature and the device identifier to the first device after generating the digital signature, and in this case, the first device may send a second information generation instruction to the hardware security module in response to the verification event, and generate the to-be-verified information carrying the digital signature and the device identifier on the basis of the digital signature and the device identifier returned by the hardware security module; wherein, the second information generation instruction is configured to indicate the hardware security module to perform the step of generating the digital signature of the device identifier on the basis of the private key and the pre-set message digest algorithm.

In the present optional embodiment, the hardware security module may generate the digital signature in response to the second information generation instruction, and return the digital signature and the device identifier to the first device; the first device generates the to-be-verified information carrying the digital signature and the device identifier.

In this case, as shown in FIG. 4, the first device sends the timestamp to the hardware security module along with a request for reading the digital signature, and the hardware security module generates the message digest of the device identifier and the timestamp; thereafter, a private key is taken to encrypt the message digest to obtain the signature, and then the first device converts the device identifier, the timestamp and the digital signature into the QR code for displaying.

Accordingly, when the to-be-verified information is to be output, in an optional embodiment, the to-be-verified information can be converted into the QR code and displayed on the first device, and the second device scans the QR code and sends the to-be-verified information to the verifying terminal.

Wherein, the QR code can be obtained after the first device obtains the to-be-verified information from the hardware security module and converts the to-be-verified information, that is, after the hardware security module generates the to-be-verified information, the hardware security module can send to-be-verified information to the first device, and the first device converts to-be-verified information into the QR code and displays on the display screen; in this case, the anti-counterfeiting client on the second device may be an application that can scan a QR code, such as a mobile phone APP, mini-program, and WeChat public account.

In a more specific optional embodiment, with reference to FIG. 3, an overall schematic flow chart of the first device displaying the QR code in the present embodiment is shown; as shown in FIG. 3, the first device can send a request for generating the content (the to-be-verified information) of the QR code to the hardware security module; the hardware security module can obtain, based on the request, the stored device identifier and the timestamp transmitted by the first device (described in an embodiment below), and generate the device identifier and the message digest of the timestamp; thereafter, the message digest is encrypted with the stored private key to obtain the digital signature (sig); after this, the digital signature is combined with the device identifier and timestamp and returned to the first device, and the first device converts the same into the QR code for displaying.

Certainly, if the above process of generating the to-be-verified information is not performed by the hardware security module, the process can be performed by the first device itself; in this case, the process of generating and displaying the QR code can be shown with reference to FIG. 4; as shown in FIG. 4, the first device can obtain the timestamp of the present moment and then send a request for generating the digital signature to the hardware security module, and the hardware security module reads the device identifier and the private key based on the request; thereafter, the device identifier and the timestamp are encrypted into the message digest, and then the message digest is encrypted with the pre-stored private key to obtain the digital signature; after this, after obtaining the digital signature and the device identifier from the hardware security module, the first device combines the timestamp, the digital signature and the device identifier and then converts the same into the QR code for displaying.

Wherein, when the first device itself performs the step of generating the to-be-verified information, the first device may have an operating system of its own to support reading the device identifier and the private key from the hardware security module and generating an environment for executing the driving SDK for the to-be-verified information.

<Implementation B>

In the implementation B, the to-be-verified information of the first device may be dynamically generated, and in particular, a corresponding digital signature may be generated in connection with a present moment when the verification event is triggered. As shown in FIGS. 3 and 4, the first device can obtain a first timestamp (the timestamp in FIGS. 3 and 4) corresponding to the present moment and generate the digital signatures of the device identifier and the first timestamp on the basis of the private key and the pre-set message digest algorithm.

Accordingly, the to-be-verified information carrying the digital signature, the device identifier and the first timestamp may be generated. Wherein, the first timestamp is configured to indicate that the verifying terminal verifies the legality of the to-be-verified information on the basis of the time interval between the second timestamp and the first timestamp; the second timestamp is a timestamp corresponding to the moment when the verifying terminal performs verification.

In a specific implementation, the first device may obtain the first timestamp, the device identifier and the private key, and then generate the message digest of the first timestamp and the device identifier on the basis of the pre-set message digest algorithm, for example, combining the first timestamp and the device identifier in a certain order and then generating the message digest of combined information; as an example of the order, the first timestamp precedes the device identifier, or the device identifier precedes the first timestamp. After this, the message digest is then encrypted with the private key, to obtain the digital signature.

In this case, the verifying terminal can first decrypt the digital signature on the basis of the public key to obtain the message digest, and then use the message digest algorithm pre-stored in the verifying terminal to calculate the message digests of the first timestamp and the device identifier; if any one of the first timestamp and the device identifier is tampered with, the two message digests are certainly inconsistent and cannot pass the verification; if the first timestamp and the device identifier are not tampered with, the two message digests are consistent, and the digital signature is verified to be legal;

in the case where the digital signature is verified to be legal, the verifying terminal may verify whether the time interval between the first timestamp and the second timestamp exceeds a time interval threshold; if so, it indicates that a counterfeiter copied the to-be-verified information and embedded the copied to-be-verified information in his own products to apply for that the verification is legal. By comparing the time interval with the threshold, such a counterfeiting means can be identified, thereby improving the anti-counterfeiting effectiveness. Certainly, if the time interval between the first timestamp and the second timestamp is not exceeding the time interval threshold, it indicates a success of passing the verification, which means that the first device is genuine.

By using present embodiment, the to-be-verified information generated by the first device dynamically changes over time since it carries the first timestamp; on the one hand, a counterfeiting means seeking to pass the verification by copying the to-be-verified information can be identified, thereby enhancing the anti-counterfeiting effectiveness. On the other hand, a user is allowed to perform multiple anti-counterfeiting verifications on the first device at different times; if each of the anti-counterfeiting verifications passes, then it indicates that the first device is a genuine product; if more than half or a preset number of the verifications fails to pass, then it may also determine that the first device is not a genuine product, thereby further enhancing the anti-counterfeiting effectiveness.

In an optional embodiment, after the first device outputs the to-be-verified information, the first device may receive a verification result fed back by the verifying terminal and, in particular, may receive the aforementioned verification result;

the verification result is rendered to the display screen of the first device for displaying, and/or the verification result is sent to the second device to be displayed on a display interface of the second device.

In the present optional embodiment, the first device can directly receive the verification result fed back by the verifying terminal; in this case, the first device can pre-establish a communicative connection with the verifying terminal, and the user can operate the first device and send a communicative connection request to the verifying terminal via the first device, wherein the connection request can carry the device identifier of the first device; as such, after obtaining the verification result, the verifying terminal can return the verification result to the first device according to the device identifier of the first device.

Certainly, in some cases, the first device may display the verification result on the display screen thereof, or in yet other cases, if the first device does not have a display screen, the first device may send the verification result to the second device so that the second device displays the verification result on the display interface of the second device.

In practice, the first device may either display the verification result on the display screen thereof or send the verification result to the second device for displaying.

Certainly, in some cases, the first device may also need not to receive the verification result fed back by the verifying terminal, and the verification result of the verifying terminal may be directly fed back to the second device for displaying, and thus the user of the second device may view the verification result on the display interface thereof, which may avoid the problem that the verification result cannot be displayed if the first device cannot establish the communicative connection with the verifying terminal, and may also avoid the problem that the anti-counterfeiting effectiveness is reduced after the first device tampers the received verification result and then displays the same again.

In an optional embodiment, two ways of outputting the to-be-verified information are given.

The first way is that, as shown above, a QR code corresponding to the to-be-verified information can be obtained, and the QR code is rendered to the display screen of the first device for displaying, so that the second device scans the QR code to obtain the to-be-verified information and sends the to-be-verified information to the verifying terminal.

In this way, the QR code converted from the to-be-verified information is displayed on the first device, and thus the first device displays the QR code on the display screen of the first device to indicate the second device to scan the QR code and send the obtained to-be-verified information to the verifying terminal.

The second way is to send the to-be-verified information directly to the second device via wired or wireless communication, so that the second device sends the to-be-verified information to the verifying terminal.

Wherein, in the first way, since the device identifier and the digital signature combined in different formats can generate different QR codes, when the to-be-verified information is generated, the device identifier and the digital signature can be combined according to a predetermined format to obtain the to-be-verified information, and then the device identifier and the digital signature combined according to the predetermined format are converted into a corresponding QR code.

In the present embodiment, the predetermined format may serve to indicate whether the to-be-verified information conforms to the predetermined format when the verifying terminal is verifying the to-be-verified information.

By way of example, given the obtained digital signature of the device identifier is sig and the device identifier is ID, the device identifier is arranged to precede the digital signature, with a semicolon therebetween, and the obtained to-be-verified information is "ID;Sig"; thereafter, "ID;Sig" is converted into a QR code m1.

By way of a further example, given the obtained digital signature of the device identifier is sig and the device identifier is ID, the device identifier is arranged to follow the digital signature, with a semicolon therebetween, and the obtained to-be-verified information reads "Sig;ID"; thereafter, "Sig;ID" is converted into a QR code m2.

Herein, the QR code m1 and the QR code m2 are different, and in this way, for the verifying terminal, when receiving the to-be-verified information sent by the second device, the verifying terminal can parse whether the combined format of the pieces of information in the to-be-verified information complies with the predetermined format; in the case of compliance with the predetermined format, the step of verifying the to-be-verified information to determine the authenticity of the first device is performed; in the case of noncompliance with the predetermined format, it means that the to-be-verified information is tampered with, and a result indicating verification failure is returned.

Certainly, the above examples are merely illustrative for ease of understanding, and in practice, the combination of the original information (the to-be-verified information) of the QR code may be combined in other ways, for example, having other delimiters therebetween, being stored in a JavaScript Object Notation (JSON) format, etc.

Wherein, in an optional embodiment, since the to-be-verified information also carries the first timestamp, when a QR code is generated according to the to-be-verified information carrying the first timestamp, the first timestamp, the device identifier and the digital signature may also be combined according to the predetermined format as in the above steps, for example, combined in a format of "device identifier; first timestamp; digital signature" and then converted into a QR code.

In this case, with the first timestamp, the to-be-verified information is richer, and there are more diversified permutations and combinations, the predetermined format thereof is less likely to be cracked, thereby ensuring the anti-counterfeiting effectiveness.

Embodiment 2

On the basis of the same inventive concept, the present disclosure further provides a anti-counterfeiting verifying method; with reference to FIG. 5, a flowchart of the step of the anti-counterfeiting verifying method is shown, and the method can be applied to a verifying terminal 103, as shown in FIG. 5, and may specifically include the following steps:

step S501, receiving to-be-verified information sent by a second device.

Wherein the to-be-verified information carries a device identifier and a digital signature of a first device, and the digital signature is a signature of the device identifier generated by the first device on the basis of a private key pre-stored in the first device and a pre-set message digest algorithm;

step S502, verifying the authenticity of the first device on the basis of the to-be-verified information, the pre-stored public key and the pre-stored message digest algorithm to obtain a verification result; and step S503, returning the verification result to the first device and/or the second device for displaying.

In the present embodiment, the process of generating the to-be-verified information can be learned about with reference to Embodiment 1 above and will not be described again here.

Wherein, the verifying terminal may receive the to-be-verified information sent by the second device via an anti-counterfeiting client; as shown in Embodiment 1 above, the to-be-verified information may be obtained after the second device scans the QR code displayed by the first device, or may be sent by the first device to the second device via wired or wireless communication. Certainly, in an optional embodiment, if the first device sends the to-be-verified information of its own, the verifying terminal may receive the to-be-verified information sent by the first device and verify the to-be-verified information.

Wherein, the verifying terminal can first decrypt the digital signature in the to-be-verified information with the pre-stored public key to obtain a message digest, and then use the pre-stored message digest algorithm to calculate a message digest of the device identifier carried in the to-be-verified information, and compare whether the two message digests are consistent; if consistent, the verification is passed, indicating that the first device is a genuine product, and if not, the verification is not passed, indicating that the first device is a counterfeit product.

Wherein, the pre-stored public key and the pre-stored message digest algorithm in the verifying terminal are uploaded to the verifying terminal during the production of the first device, and at the same time, the private key corresponding to the public key and the message digest algorithm are also stored in the first device. It should be noted that if the first device is genuine, the message digest algorithm stored in the first device is the same as the message digest algorithm stored in the verifying terminal, and the private key stored in the first device and the pre-stored public key in the verifying terminal are a pair of keys. Therefore, as long as the verifying terminal uses the public key to decrypt the digital signature successfully, and the two message digests obtained through the verification calculation are consistent, it can be known that the first device is genuine. If the verifying terminal cannot decrypt with the public key or the two message digests are inconsistent, it can be known that the first device is not genuine.

After obtaining the verification result, the verifying terminal can send the verification result to the first device, and the process of sending the same to the first device is described in Embodiment 1 above, and reference can be made to the relevant description of Embodiment 1 for details.

In practice, the verifying terminal preferably returns the verification result to the second device for displaying, and in particular, returns the same to the anti-counterfeiting client where the second device is located, to display the verification result on the third-party device, thereby preventing a possible anti-counterfeiting failure where the counterfeit first device tampers with the result when the verification result is returned to the first device, which effectively improves the anti-counterfeiting effectiveness.

Certainly, the verifying terminal may also return the verification result to the first device and the second device, and in this case, the verification result displayed by the first device and the verification result displayed by the second device should be consistent in normal conditions; if there is inconsistency, for example, the first device shows a success of passing the verification, and the second device shows a failure to pass the verification, the user may thus know that the first device may have tampered with the verification result, indicating that the first device is an illegal counterfeit device.

The solution of the embodiments of the present disclosure has the following advantages.

Since the private key of the asymmetric encryption algorithm is stored in the first device, in practice, the private key can be stored in a secured storage space of the first device and is not easy to be stolen, and thus the validity of the anti-counterfeiting verification is improved by means of the pre-stored private key; in addition, the message digest algorithm is mainly characterized in that the encrypted data cannot be decrypted, and the digests of the device identifier calculated by different message digest algorithms are different, hence the anti-counterfeiting validity can be further improved by means of the message digest algorithm.

In an optional embodiment, as described in the above embodiment of the first device side, the to-be-verified information may carry a first timestamp, and to verify the authenticity of the first device according to the to-be-verified information, it is possible to verify whether a time interval between the first timestamp and a second timestamp of a present moment of the verifying terminal is greater than a time interval threshold, and if the time interval is greater than the threshold, the verification indicates illegality.

Specifically, in step S502, the digital signature can be verified on the basis of the pre-stored public key and the pre-stored message digest algorithm; if the digital signature passes the verification, the second timestamp corresponding to the present moment is obtained; on the basis of the time interval between the first timestamp and the second timestamp, the verification for the authenticity of the first device is made to obtain the verification result.

Specifically, in the case where the time interval is greater than or equal to the time interval threshold, the first device is verified as counterfeit, and a illegal verification result is obtained; in the case where the time interval is less than the time interval threshold, the first device is verified as not the counterfeit device, and a legal verification result is obtained.

In the present embodiment, the process of generating the to-be-verified information carrying the first timestamp may be as described above in implementation B of Embodiment 1 and will not be described in detail herein.

Wherein, the verifying terminal may first decrypt the digital signature on the basis of the public key to obtain a message digest, and then use the message digest algorithm pre-stored in the verifying terminal to calculate the first timestamp and the message digest of the device identifier, and if the calculated message digest is inconsistent with the message digest carried in the to-be-verified information, the verification is not passed; if consistent, the digital signature is verified to be legal.

In the case where the digital signature is verified to be legal, the verifying terminal may verify whether the time interval between the first timestamp and the second time-stamp exceeds a time interval threshold. In the present embodiment, if a counterfeiter copy the QR code displayed by the first device for use in the counterfeit product, seeking to pass the anti-counterfeiting verification; however, the first timestamp is dynamically generated, reflecting the moment when the first device generates the to-be-verified informa-tion, and there surely is a long interval between such a moment and the time when the counterfeit product is veri-fied, hence verifying whether the time interval between the first timestamp and the second timestamp exceeds the time interval threshold can identify such a counterfeit situation.

Wherein, if the time interval exceeds the time interval threshold, it indicates that a counterfeiter copied the to-be-verified information and embedded the copied to-be-verified information in its own products to apply for that the veri-fication is legal. By comparing the time interval with the threshold, such a counterfeiting means can be identified, thereby improving the anti-counterfeiting effectiveness.

Certainly, if the time interval between the first timestamp and the second timestamp does not exceed the time interval threshold, the verification is passed, indicating that the first device is genuine.

By using the present embodiment, the to-be-verified information generated by the first device dynamically changes over time since it carries the first timestamp, and thus a counterfeiting means by copying the to-be-verified information can be identified, thereby enhancing the anti-counterfeiting effectiveness.

As described in Embodiment 1 above, in an optional embodiment, the first device can output the to-be-verified information as a QR code for displaying, and the QR code is obtained after converting the device identifier and the digital signature combined according to a predetermined format, therefore, when the to-be-verified information at the verifying terminal is verified, it is determined whether the format of the to-be-verified information complies with the predetermined format after the to-be-verified information is parsed out; in the case of compliance, a step of verifying the authenticity of the first device on the basis of the to-be-verified information, the pre-stored public key and the pre-stored message digest algorithm to obtain the verifica-tion result is performed; in the case of noncompliance, a illegal verification result is returned to the first device and/or the second device for displaying.

In the present embodiment, the process of combining the device identifier and the digital signature according to the predetermined format to obtain the corresponding QR code may be as described with reference to Embodiment 1 above.

The verifying terminal, when the to-be-verified informa-tion is received, may firstly parse the to-be-verified infor-mation to obtain a combination format of the device iden-tifier and the digital signature in the to-be-verified information, and if the format complies with the predetermined format, then the process proceeds to a next step, that is, entering the step of decrypting the digital signature with the public key to obtain a message digest, and calculating a message digest of the device identifier with the pre-stored message digest algorithm, and comparing the two message digests to see if they are consistent.

If the format of combination does not comply with the predetermined format, it means that the to-be-verified infor-mation is tampered with, and a verification result indicating failure (verification is illegal) is returned to the second device.

By way of example, given that the combination format of the device identifier ID and the digital signature sig in the to-be-verified information is "Sig;ID", but the predeter-mined format is "ID;Sig", they are inconsistent, and thus a verification result indicating failure is returned; if the com-bination format of the device identifier ID and the digital signature sig in the to-be-verified information is "ID;Sig", which complies with the predefined format, they are con-sistent and thus the process proceeds to a next step of verification.

In an optional embodiment, different first devices may correspond to different public keys, and accordingly, the verifying terminal may pre-store a correspondence relation-ship between the identifier of each first device and the public key.

Specifically, the verifying terminal may receive pieces of anti-counterfeiting information respectively sent for a plu-rality of first devices, each of the pieces of anti-counterfeit-ing information including a respective identity and a corre-sponding public key of the plurality of first devices. Wherein, different first devices correspond to different pub-lic keys, the anti-counterfeiting information is sent by the first device or sent by the hardware security module con-figured onto the first device, and different hardware security modules are configured onto different first devices.

Accordingly, the public key pre-stored by the first device to be verified is a target public key that corresponds to the device identifier and is obtained from a plurality of pieces of anti-counterfeiting information.

In the present embodiment, in the case where each first device is configured with the hardware security module, the device identifier of the first device and the corresponding public key can be sent to the verifying terminal via the hardware security module before the first device is delivered from the factory, so that the verifying terminal stores the device identifier of each first device and the corresponding public key.

Certainly, in the case where the first device is not con-figured with the hardware security module, the device iden-tifier of the first device and the corresponding public key are sent by the first device to the verifying terminal before the first device is delivered from the factory, and in this case, the private key and the device identifier of the first device are stored in the secured storage of the first device.

In the present embodiment, since different first devices correspond to different private keys, that is, different first devices also correspond to different public keys, each first device has its own independent asymmetric encryption key. In this way, when the to-be-verified information of the first device is received, the verifying terminal can search for a corresponding public key according to the device identifier carried in the to-be-verified information; if the public key is found, the public key is used to verify the to-be-verified information, to verify the authenticity of the first device.

If the corresponding target public key is not found, it means that the device identifier of the first device is not pre-stored in the verifying terminal; in this case, since the first device must pre-store the device identifier and the public key of the first device to the verifying terminal in production, if the verifying terminal cannot find the corresponding target public key according to the device identifier in the to-be-verified information, it means that the first device to be verified is a counterfeit device, and therefore a illegal verification result can be returned to the first device and/or the second device for displaying.

In the present embodiment, since different first devices correspond to different public keys, that is, different first devices correspond to different private keys, in this way, both the private key and the public key individually correspond to one first device; therefore, even if the private key of one of the first devices is stolen, the private keys of other first devices cannot be stolen, thus improving the security of the private key and the public key of each first device, and enhancing the anti-counterfeiting effectiveness of the terminal devices.

Certainly, in an optional embodiment, different first devices may also correspond to one public key; therefore, the hardware security module or the first device only needs only to send the public key to the verifying terminal, and the device identifier may not need to be sent to the verifying terminal for storage. Such an embodiment may reduce the storage pressure of the verifying terminal.

Referring to FIG. 6, an optional schematic flowchart of the verifying terminal verifying the authenticity of the first device is shown, and as shown in FIG. 6:

S61, after the second device scans to obtain the to-be-verified information, the verifying terminal receives the to-be-verified information obtained by the second device; thereafter, the to-be-verified information is parsed to determine whether the format of the to-be-verified information complies with the predetermined format; if no, information indicating failure to pass the verification is returned to the second device; if yes, the flow proceeds to step S62;

S62, according to the device identifier of the first device, a search for a corresponding public key from a database is conducted; if the public key is found, the flow proceeds to step S63; and if the public key is not found, the information indicating failure to pass the verification is returned to the second device;

S63, the public key is taken to decrypt and obtain a message digest in the digital signature, the pre-stored message digest is taken to calculate a digest of the device identifier carried in to-be-verified information, and a determination is made as to whether the two digests are consistent; if consistent, the flow proceeds to S64; if not consistent, the information indicating failure to pass the verification (verified to be illegal) is returned to the second device;

S64, a determination is made as to whether the time interval between the first timestamp carried and the second timestamp of the present moment is less than the time interval threshold; if yes, information indicating a success of passing the verification is returned to the second device, and if no, information indicating a failure of passing the verification is returned to the second device.

Embodiment 3

On the basis of the same inventive concept, with reference to FIG. 7, a flowchart of the step of an another anti-counterfeiting verifying method, as shown in FIG. 7, can be applied to a second device 102, and can specifically includes:

step S701, obtaining to-be-verified information from the first device.

Wherein the to-be-verified information carries a device identifier and a digital signature of a first device, and the digital signature is a signature of the device identifier generated by the first device on the basis of a private key pre-stored in the first device and a pre-set message digest algorithm;

step S702, sending a verification request carrying the to-be-verified information to a verifying terminal to indicate the verifying terminal to verify the authenticity of the first device according to the to-be-verified information, and feeding back a verification result to the first device and/or second device for displaying.

In the present embodiment, the process of generating the to-be-verified information may be learned about with reference to the above description of Embodiment 1, and the process of verifying the to-be-verified information to verify the authenticity of the first device may be learned about with reference to the above description of Embodiment 2.

In a specific implementation, an anti-counterfeiting client can run on the second device, and the anti-counterfeiting client can be downloaded from an application service to which the verifying terminal belongs; when a user needs to verify the authenticity of the first device, he may open the anti-counterfeiting client and trigger a physical key on the first device or a control on a display interface of the first device at the same time, so that the first device generates the to-be-verified information.

Thereafter, the second device may receive the to-be-verified information sent by the first device via wireless communication such as Bluetooth; or, in an optional embodiment, as described in the above embodiment of the first device side, the to-be-verified information may be displayed on the first device in the form of a QR code, and thus the process of the second device obtaining the to-be-verified information may be scanning the QR code displayed by the first device to obtain to-be-verified information, wherein the QR code is generated by the first device on the basis of the to-be-verified information.

To scan the QR code, the user may open a "scan" control on the anti-counterfeiting client, open a camera of the second device, and then start scanning and verifying the QR code of the first device to obtain the to-be-verified information; thereafter, the user clicks a "send" control popped up by the anti-counterfeiting client, and the second device sends the to-be-verified information to the verifying terminal.

Certainly, in yet another optional embodiment, if the first device does not have a display screen, the first device may also send the to-be-verified information to the second device via wired or wireless communication, and the first device may receive the to-be-verified information sent by the first device via wired or wireless communication.

In specific implementation, the second device may scan the QR code displayed on the first device to obtain the to-be-verified information, or may receive the to-be-verified information sent by the first device via wired or wireless communication.

Certainly, in some embodiments, the second device may directly receive the verification result sent by the verifying terminal and display the same on the display screen of the second device; in this case, the verification result may not need to be displayed on the first device.

In a specific example, taking a screen terminal in an Internet of Things terminal as the first device, a verifying server as the verifying terminal, and a mobile phone as the second device, a description of the anti-counterfeiting verifying method of the present disclosure is given below; with reference to FIG. 8, an overall schematic flow chart of the anti-counterfeiting verifying method of the present disclosure is shown, as shown in FIG. 8, (1) in the screen terminal production phase (corresponding to steps 1 to 4 in FIG. 8), a certain number of hardware security modules can be prepared according to the production plan of the Internet of things terminal, and different hardware security modules are configured onto different screen terminals; the hardware security module then generates a unique terminal ID, a private key and a corresponding public key, wherein the unique terminal ID and the private key are written in the hardware security module, and the public key and the corresponding terminal ID are sent to a verifying server; the private keys generated by different hardware security modules are different, and thus the public keys generated by different hardware security modules are also different.

When the public key and the corresponding terminal ID sent by each hardware security module are received by the server, the server may store the public key and the corresponding terminal ID in association.

A driving SDK for reading information (the terminal ID and private key) stored in the hardware security module is integrated in the screen terminal, and an algorithm for generating a QR code is integrated therein.

(2) In the phase where the screen terminal is in use after delivery from the factory (corresponding to steps 5 to 8 in FIG. 8), S1, the user downloads an official anti-counterfeiting client of the manufacturer of the screen terminal on a mobile phone (including but not limited to the mobile phone app, mini-program, WeChat public account, etc.);

S2, the user presses a hot key on the screen terminal or enters the display interface of the screen terminal, and clicks a pre-set control to trigger the verification event; at this moment, the screen terminal obtains the first timestamp of the present moment, and sends the first information generation instruction to the hardware security module to indicate the hardware security module to generate the to-be-verified information on the basis of the unique terminal ID and the private key;

S3, the hardware security module firstly calculates to derive message digests of the terminal ID and the first timestamp on the basis of the pre-set message digest algorithm, and then encrypts the message digests with the private key to obtain the digital signature sig; the terminal ID, the first timestamp and the digital signature are combined in a format of "device identifier; first timestamp; digital signature", and then returned to the screen terminal; the to-be-verified information obtained by the screen terminal is converted by the screen terminal into a QR code for displaying on the display screen;

S4, the user scans the QR code with the "scan" control provided by the anti-counterfeiting client on a mobile phone to obtain the to-be-verified information, and sends the to-be-verified information to the verifying server through the anti-counterfeiting client;

S5, the verifying server receives the to-be-verified information, and firstly, determines whether the combination of the terminal ID, the first timestamp and the digital signature in the to-be-verified information complies with the format of "device identifier; first timestamp; digital signature", and then, if yes, proceeds to S6, and if no, returns information that the mobile phone fails to pass the verification;

S6, a search for a public key corresponding to the terminal ID carried in the to-be-verified information from a database is conducted; if the public key is found, the process proceeds to S7; and if the public key is not found, information is returned to indicate that the mobile phone fails to pass the verification;

S7, the public key is used to decrypt and obtain the message digest in the digital signature, the pre-stored message digest algorithm is used to calculate the digest of the terminal ID carried in the to-be-verified information, and a determination is made as to whether the two digests are consistent; if they are consistent, the process proceeds to S8, and if not, information is returned to indicate that the mobile phone fails to pass the verification;

S8, a determination is made as to whether the time interval between the first timestamp carried and the second timestamp of the present moment of the verifying server is less than a time interval threshold, for example, 2 hours; if the time interval is less than 2 hours, then a message is returned to show that the mobile phone passes the verification; if not, then information is returned to indicate that the mobile phone fails to pass the verification; the mobile phone displays the anti-counterfeiting verification result through the mini-program or WeChat public account.

On the basis of the same inventive concept, the present disclosure further provides a hardware apparatus for performing the anti-counterfeiting verifying method.

Optionally, the hardware apparatus includes a hardware device to be verified for anti-counterfeiting, and a hardware security module configured onto the hardware device, wherein the hardware security module stores the device identifier and the private key of the hardware device.

Optionally, the hardware device may be configured with a display screen and, in particular, the display screen may be configured onto the hardware device to be verified.

Figure 9:
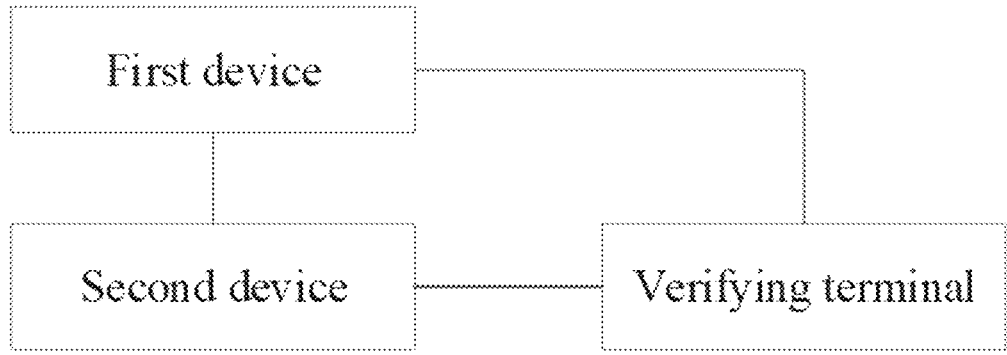
FIG. 9 schematically shows a schematic structural diagram of an anti-counterfeiting verifying system of the present disclosure.

On the basis of the same inventive concept, the present disclosure further provides an anti-counterfeiting verifying system; reference is made to FIG. 9, which shows a schematic structural diagram of the anti-counterfeiting verifying system, the system, as shown in FIG. 9, includes a first device, a verifying terminal, and a second device, wherein a first device configured to execute a step of generating to-be-verified information of the first device in response to a triggered verification event and output the to-be-verified information;

a second device configured to obtain the to-be-verified information and send the to-be-verified information to a verifying terminal;

the verifying terminal configured to verify the authenticity of the first device according to the to-be-verified information, and feed back a verification result to the first device and/or the second device for displaying, wherein the step of generating the to-be-verified information of the first device includes:

obtaining a device identifier of the first device and a private key pre-stored in the first device; generating a digital signature of the device identifier on the basis of the private key and a pre-set message digest algorithm;

and generating the to-be-verified information carrying the digital signature and the device identifier.

In the present embodiment, the first device is configured to perform the anti-counterfeiting verifying method described in Embodiment 1, the verifying terminal is configured to perform the anti-counterfeiting verifying method described in Embodiment 2, and the second device is configured to perform the anti-counterfeiting verifying method described in Embodiment 3.

Figure 10:
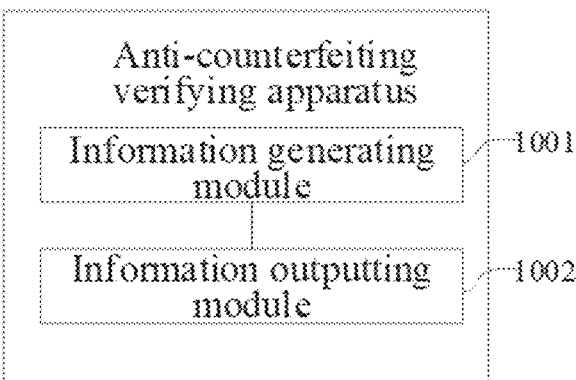
FIG. 10 schematically shows a schematic structural diagram of an anti-counterfeiting verifying apparatus of the present disclosure.

On the basis of the same inventive concept, the present disclosure further provides an anti-counterfeiting verifying apparatus, and with reference to FIG. 10, the anti-counterfeiting verifying apparatus includes:

an information generating module 1001 for executing a step of generating to-be-verified information of the first device in response to a triggered verification event;

an information outputting module 1002 for outputting the to-be-verified information to indicate a second device to send the to-be-verified information to a verifying terminal, the verifying terminal being configured to for verifying the authenticity of the first device according to the to-be-verified information, and feeding back a verification result to the first device and/or the second device for displaying;

wherein the information generating module 1001 includes:

an obtaining unit configured for obtaining a device identifier of the first device and a private key pre-stored in the first device;

a signature unit configured for generating a digital signature of the device identifier on the basis of the private key and a pre-set message digest algorithm; and a generating unit configured for generating the to-be-verified information carrying the digital signature and the device identifier.

Optionally, the device identifier and the private key are located within a secured storage of the hardware device, and the obtaining unit is configured to obtain the device identifier and the private key from the secured storage area.

Optionally, the signature unit includes:

a timestamp obtaining subunit configured for obtaining a first timestamp corresponding to a present moment;

a signature subunit configured for generating the digital signature of the device identifier and the first timestamp on the basis of the private key and the pre-set message digest algorithm;

a generating unit specifically configured for generating the to-be-verified information carrying the digital signature, the device identifier and the first timestamp, wherein the first timestamp is configured to indicate that the verifying terminal verifies the legality of the to-be-verified information on the basis of a time interval between a second timestamp and the first timestamp; the second timestamp is a timestamp corresponding to a moment when the verifying terminal performs verification.

Optionally, the hardware device is configured with a hardware security module, the device identifier and the pre-stored private key are located within the hardware security module, and the information generating module is specifically configured to send a first information generation instruction to the hardware security module in response to the verification event; the first information generation instruction is configured to indicate the hardware security module to execute the step of generating the to-be-verified information of the first device;

Or, the information generating module is configured to send a second information generation instruction to the hardware security module in response to the verification event, and generate the to-be-verified information carrying the digital signature and the device identifier on the basis of the digital signature and the device identifier returned by the hardware security module;

wherein the second information generation instruction is configured to indicate the hardware security module to execute a step of generating the digital signature of the device identifier on the basis of the private key and the pre-set message digest algorithm.

Optionally, the information outputting module includes at least one of:

a first outputting unit configured for obtaining a QR code corresponding to the to-be-verified information, rendering the QR code to a display screen of the first device for displaying so that the second device scans the QR code to obtain the to-be-verified information, and sending the to-be-verified information to the verifying terminal; and a second outputting unit configured for sending the to-be-verified information to the second device via wired or wireless communication so that the second device sends the to-be-verified information to the verifying terminal.

Optionally, the hardware device is configured with the hardware security module, the device identifier and the pre-stored private key are located within the hardware security module, and the step of obtaining the QR code corresponding to the to-be-verified information includes:

obtaining the to-be-verified information from the hardware security module, and converting the to-be-verified information into the QR code, wherein the to-be-verified information is generated by the hardware security module.

Optionally, the generating unit includes:

a combining subunit configured for combining the device identifier and the digital signature according to a predetermined format to obtain the to-be-verified information, wherein the QR code corresponding to the to-be-verified information is obtained after converting the device identifier and the digital signature combined according to the predetermined format; and the predetermined format is configured to indicate the verifying terminal to verify whether the to-be-verified information complies with the predetermined format when verifying the to-be-verified information.

Optionally, the apparatus further includes:

a result receiving module configured for receiving the verification result;

a result presenting module configured for rendering the verification result to a display screen of the first device for displaying; and/or sending the verification result to the second device to be displayed on a display interface of the second device.

Optionally, the signature unit includes:

a digest calculating subunit configured for generating a message digest of the device identifier on the basis of the pre-set message digest algorithm;

an encrypting subunit configured for encrypting the message digest of the device identifier with the pre-stored private key to obtain the digital signature.

Figure 11:
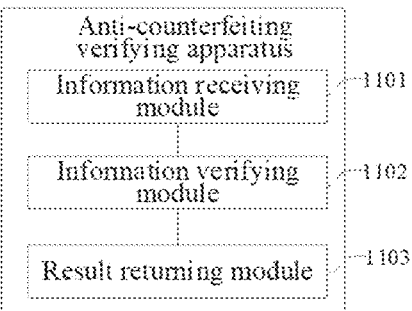
FIG. 11 schematically shows a schematic structural diagram of another anti-counterfeiting verifying apparatus of the present disclosure.

On the basis of the same inventive concept, an anti-counterfeiting verifying apparatus is further provided; with reference to FIG. 11, which shows a schematic structural diagram of the apparatus, the apparatus is applied to a verifying terminal and includes:

an information receiving module 1101 configured for receiving to-be-verified information sent by a second device, wherein the to-be-verified information carries a device identifier and a digital signature of a first device, and the digital signature is a signature of the device identifier generated by the first device on the basis of a private key pre-stored in the first device and a pre-set message digest algorithm;

a verifying module 1102 configured for verifying the authenticity of the first device on the basis of the to-be-verified information, a pre-stored public key, and the pre-stored message digest algorithm to obtain a verification result; and a result returning module 1103 configured for returning the verification result to the first device and/or the second device for displaying.

Optionally, the to-be-verified information carries the first timestamp, and the verifying module 1102 includes:

a signature verifying unit configured for verifying the digital signature on the basis of the pre-stored public key and the pre-stored message digest algorithm;

a timestamp obtaining unit configured for obtaining the second timestamp corresponding to the present moment in response to the digital signature passing the verification; and a time verifying unit configured for verifying the authenticity of the first device on the basis of a time interval between the first timestamp and the second timestamp, to obtain the verification result.

Optionally, the time verifying unit is specifically configured for:

verifying the first device to be fake in a case where a time interval is greater than or equal to a time interval threshold to obtain the illegal verification result; and verifying the first device to be not fake in a case where the time interval is less than the time interval threshold to obtain the legal verification result.

Optionally, the to-be-verified information is sent after the second device scans the QR code displayed by the first device; the apparatus further includes:

a format determining module configured for determining whether a format of the to-be-verified information complies with a predetermined format;

the verifying module 1102 configured for, when the format of the to-be-verified information complies with the predetermined format, executing the step of verifying the authenticity of the first device on the basis of the to-be-verified information, the pre-stored public key, and the pre-stored message digest algorithm to obtain the verification result; and the result returning module 1102 configured for, when the format of the to-be-verified information does not comply with the predetermined format, returning the illegal verification result to the first device and/or the second device for displaying.

Optionally, the apparatus further includes:

an anti-counterfeiting information receiving module configured for receiving anti-counterfeiting information sent respectively for a plurality of first devices, each piece of the anti-counterfeiting information including respective identifiers of the plurality of first devices and corresponding public keys, wherein different first devices correspond to different public keys, and the anti-counterfeiting information is sent by the first device or sent by a hardware security module configured onto the first device, different hardware security modules being configured onto different first devices; the pre-stored public key is a target public key corresponding to the device identifier obtained from a plurality of pieces of the anti-counterfeiting information; and the result returning module 1103 further configured to return the illegal verification result to the first device and/or the second device for displaying in a case where the target public key is not obtained.

Figure 12:
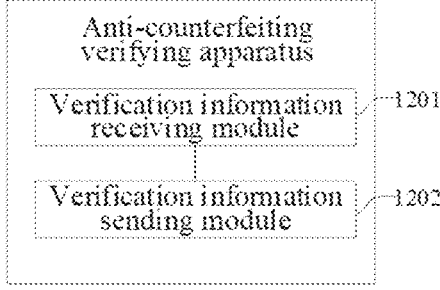
FIG. 12 schematically shows a schematic structural diagram of yet another anti-counterfeiting verifying apparatus of the present disclosure.

On the basis of the same inventive concept, an anti-counterfeiting verifying apparatus is further provided; reference is made to FIG. 12, which shows a schematic structural diagram of the apparatus, the apparatus, as shown in FIG. 12, is applied to a second apparatus and includes:

a verification information receiving module 1201 configured for obtaining to-be-verified information from a first device, wherein the to-be-verified information carries a device identifier and a digital signature of the first device, and the digital signature is a signature of the device identifier generated by the first device on the basis of a private key pre-stored in the first device and a pre-set message digest algorithm;

a verification information sending module 1202 configured for sending a verification request carrying the to-be-verified information to a verifying terminal to indicate the verifying terminal to verify the authenticity of the first device according to the to-be-verified information, and feeding back a verification result to the first device and/or second device for displaying.

Optionally, the verification information receiving module 1201 includes at least one of:

a scan-obtaining unit configured for scanning a QR code displayed by the first device to obtain the to-be-verified information, wherein the QR code is generated by the first device on the basis of the to-be-verified information; and a communication receiving unit configured for receiving the to-be-verified information sent by the first device via wired or wireless communication.

On the basis of the same inventive concept, the present disclosure further provides a computer-readable storage medium storing a computer program for causing a processor to execute the anti-counterfeiting verifying method.

On the basis of the same inventive concept, the present disclosure further provides an electronic device including a memory, a processor, and a computer program stored in the memory and executable on the processor, which when executed by the processor implements the anti-counterfeiting verifying method.

Each embodiment in the present specification is described in a progressive manner, each embodiment highlights the difference from other embodiments, and the same or similar parts between the embodiments can be referred to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices.

Unless further limitation is set forth, an element defined by the wording "comprising a . . . " does not exclude additional same element in the process, method, article or device comprising the element.

The above provides an anti-counterfeiting verification method, a hardware device, a system, an electronic equipment and a storage medium have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

After considering the specification and practicing the inventions disclosed here, a person skilled in the art will easily think of other embodiments of the present disclosure. The present disclosure aims to cover any variations, uses or adaptive changes in present disclosure. These variations, uses or adaptive changes follow the general principles of the present disclosure and include public knowledge or common technical means in this art that are not disclosed in the present disclosure. Specification and embodiments are only treated as illustrative, and the true scope and spirit of this disclosure are stated in the following claims.

It should be understood that the present disclosure is not limited to the accurate structure that has been described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An anti-counterfeiting verifying method, wherein the method is applied to a first device and comprises:

executing a step of generating to-be-verified information of the first device in response to a triggered verification event;

outputting the to-be-verified information to indicate a second device to send the to-be-verified information to a verifying terminal, the verifying terminal being configured for verifying authenticity of the first device according to the to-be-verified information, and feeding back a verification result to the first device and the second device for displaying;

wherein the step of generating the to-be-verified information of the first device comprises:

obtaining a device identifier of the first device and a private key pre-stored in the first device; generating a digital signature of the device identifier on the basis of the private key and a pre-set message digest algorithm; and generating the to-be-verified information carrying the digital signature and the device identifier;

wherein the step of generating the digital signature of the device identifier on the basis of the private key and the pre-set message digest algorithm comprises:

obtaining a first timestamp corresponding to a present moment:

generating the digital signature of the device identifier and the first timestamp on the basis of the private key and the pre-set message digest algorithm;

generating the to-be-verified information carrying the digital signature and the device identifier comprises:

generating the to-be-verified information carrying the digital signature, the device identifier and the first timestamp;

wherein the first timestamp is configured to indicate that the verifying terminal verifies the legality of the to-be-verified information on the basis of a time interval between a second timestamp and the first timestamp; the second timestamp is a timestamp corresponding to a moment when the verifying terminal performs verification; and the verification by the verifying terminal on the legality of the to-be-verified information on the basis of the time interval between a second timestamp and the first timestamp comprises, by the verifying terminal, verifying whether the time interval between the first timestamp and the second timestamp exceeds a time interval threshold, wherein if yes, it indicates that a counterfeiter copied the to-be-verified information and embedded the copied to-be-verified information in the counterfeiter's own product to apply for that the verification is legal; and wherein, if the first device displays a success of passing the verification, and the second device displays a failure to pass the verification, it indicates that the first device has tampered with the verification result, indicating that the first device is an illegal counterfeit device.

2. The method according to claim 1, wherein the first device comprises a hardware device, and the hardware device is configured with a hardware security module, the device identifier and the pre-stored private key are located within the hardware security module, and executing the step of generating the to-be-verified information of the first device in response to the triggered verification event comprises:

sending a first information generation instruction to the hardware security module in response to the verification event, wherein the first information generation instruction is configured to indicate the hardware security module to execute the step of generating the to-be-verified information of the first device; or sending a second information generation instruction to the hardware security module in response to the verification event, and generating the to-be-verified information carrying the digital signature and the device identifier on the basis of the digital signature and the device identifier returned by the hardware security module;

wherein the second information generation instruction is configured to indicate the hardware security module to execute the step of generating the digital signature of the device identifier on the basis of the private key and the pre-set message digest algorithm.

3. The method according to claim 1, wherein the step of outputting the to-be-verified information comprises at least one of:

obtaining a quick response (QR) code corresponding to the to-be-verified information, rendering the QR code to a display screen of the first device for displaying so that the second device scans the QR code to obtain the to-be-verified information, and sending the to-be-verified information to the verifying terminal; and sending the to-be-verified information to the second device via wired or wireless communication so that the second device sends the to-be-verified information to the verifying terminal.

4. The method according to claim 3, wherein the first device comprises a hardware device, and the hardware device is configured with a hardware security module, the device identifier and the pre-stored private key are located within the hardware security module, and obtaining the QR code corresponding to the to-be-verified information comprises:

obtaining the to-be-verified information from the hardware security module, and converting the to-be-verified information into the QR code, wherein the to-be-verified information is generated by the hardware security module.

5. The method according to claim 3, wherein generating the to-be-verified information carrying the digital signature and the device identifier comprises:

combining the device identifier and the digital signature according to a predetermined format to obtain the to-be-verified information;

wherein the QR code corresponding to the to-be-verified information is obtained after converting the device identifier and the digital signature combined according to the predetermined format; and the predetermined format is configured to indicate the verifying terminal to verify whether the to-be-verified information complies with the predetermined format when verifying the to-be-verified information.

6. The method according to claim 1, wherein the step of generating the digital signature of the device identifier on the basis of the pre-stored private key and the pre-set message digest algorithm comprises:

generating a message digest of the device identifier on the basis of the pre-set message digest algorithm; and encrypting the message digest of the device using the pre-stored private key to obtain the digital signature.

7. A hardware apparatus, wherein the hardware apparatus is configured to execute the anti-counterfeiting verifying method according to claim 1, the hardware apparatus comprising a hardware device to be verified for authenticity thereof and a hardware security module configured onto the hardware device;

wherein the hardware security module stores a device identifier and a private key of the hardware device.

8. An electronic device, wherein the electronic device stores a computer program that causes a processor to execute the anti-counterfeiting verifying method according to claim 1.

9. A non-transitory computer-readable storage medium, wherein the non-transitory computer-readable storage medium stores a computer program that causes a processor to execute the anti-counterfeiting verifying method according to claim 1.

10. The method according to claim 2, wherein the step of generating the digital signature of the device identifier on the basis of the pre-stored private key and the pre-set message digest algorithm comprises:

generating a message digest of the device identifier on the basis of the pre-set message digest algorithm; and encrypting the message digest of the device using the pre-stored private key to obtain the digital signature.

11. The method according to claim 3, wherein the step of generating the digital signature of the device identifier on the basis of the pre-stored private key and the pre-set message digest algorithm comprises:

generating a message digest of the device identifier on the basis of the pre-set message digest algorithm; and encrypting the message digest of the device using the pre-stored private key to obtain the digital signature.

12. The method according to claim 4, wherein the step of generating the digital signature of the device identifier on the basis of the pre-stored private key and the pre-set message digest algorithm comprises:

generating a message digest of the device identifier on the basis of the pre-set message digest algorithm; and encrypting the message digest of the device using the pre-stored private key to obtain the digital signature.

13. The method according to claim 5, wherein the step of generating the digital signature of the device identifier on the basis of the pre-stored private key and the pre-set message digest algorithm comprises:

generating a message digest of the device identifier on the basis of the pre-set message digest algorithm; and encrypting the message digest of the device using the pre-stored private key to obtain the digital signature.

14. An anti-counterfeiting verifying method, wherein the method is applied to a verifying terminal and comprises:

receiving to-be-verified information sent by a second device, wherein the to-be-verified information carries a device identifier and a digital signature of a first device, and the digital signature is a signature of the device identifier generated by the first device on the basis of a private key pre-stored in the first device and a pre-set message digest algorithm;

verifying the authenticity of the first device on the basis of the to-be-verified information, a pre-stored public key and the pre-stored message digest algorithm to obtain a verification result; and returning the verification result to the first device and the second device for displaying;

wherein the to-be-verified information carries a first timestamp, and a step of verifying the authenticity of the first device on the basis of the to-be-verified information, the pre-stored public key and the pre-stored message digest algorithm to obtain the verification result comprises:

verifying the digital signature on the basis of the pre-stored public key and the pre-stored message digest algorithm;

obtaining a second timestamp corresponding to a present moment when the verification of the digital signature is passed;

verifying the first device to be fake in a case where a time interval between the first timestamp and the second timestamp is greater than or equal to a time interval threshold to obtain an illegal verification result; and verifying the first device to be not fake in a case where the time interval between the first timestamp and the second timestamp is less than the time interval threshold to obtain a legal verification result; and wherein, if the first device displays a success of passing the verification, and the second device displays a failure to pass the verification, it indicates that the first device has tampered with the verification result, indicating that the first device is an illegal counterfeit device.

15. The method according to claim 14, wherein the to-be-verified information is sent after the second device scans a QR code displayed by the first device; before the step of verifying the authenticity of the first device on the basis of the to-be-verified information, the pre-stored public key and the pre-stored message digest algorithm to obtain the verification result, the method further comprises:

determining whether a format of the to-be-verified information complies with a predetermined format;

when the format of the to-be-verified information complies with the predetermined format, executing the step of verifying authenticity of the first device on the basis of the to-be-verified information, the pre-stored public key and the pre-stored message digest algorithm to obtain the verification result; and when the format of the to-be-verified information does not comply with the predetermined format, returning a result verified to be illegal to the first device and/or the second device for displaying.

16. The method according to claim 14, wherein before receiving the to-be- verified information sent by the first device or the second device, the method further comprises:

receiving anti-counterfeiting information sent respectively for a plurality of first devices, each piece of the anti-counterfeiting information comprising respective identifiers of the plurality of first devices and corresponding public keys, wherein different first devices correspond to different public keys, and the anti-counterfeiting information is sent by the first device or sent by a hardware security module configured onto the first device, wherein different hardware security modules are configured onto different first devices;

the pre-stored public key is a target public key corresponding to the device identifier obtained from a plurality of pieces of the anti-counterfeiting information;

the method further comprises:

returning a result verified to be illegal to the first device and/or the second device for displaying in a case where the target public key is not obtained.

17. An anti-counterfeiting verifying method, wherein the method is applied to a second device and comprises:

obtaining to-be-verified information from a first device, wherein the to-be-verified information carries a device identifier and a digital signature of the first device, and the digital signature is a signature of the device identifier generated by the first device on the basis of a private key pre-stored in the first device and a pre-set message digest algorithm;

sending a verification request carrying the to-be-verified information to a verifying terminal to indicate the verifying terminal to verify the authenticity of the first device according to the to-be-verified information, and feeding back a verification result to the first device and the second device for displaying;

wherein the step of obtaining the to-be-verified information from the first device comprises at least one of:

scanning a QR code displayed by the first device to obtain the to-be-verified information, wherein the QR code is generated by the first device on the basis of the to-be-verified information; and receiving the to-be-verified information sent by the first device via wired or wireless communication; and wherein, if the first device displays a success of passing the verification, and the second device displays a failure to pass the verification, it indicates that the first device has tampered with the verification result, indicating that the first device is an illegal counterfeit device.

* * * * *